United States Patent
Vis et al.

(10) Patent No.: US 6,530,060 B1
(45) Date of Patent: Mar. 4, 2003

(54) SAMPLED AMPLITUDE READ CHANNEL EMPLOYING A POST PROCESSOR WITH A BOUNDARY ERROR COMPENSATOR WHICH COMPENSATES FOR BOUNDARY ERROR EVENTS IN A SPLIT-FIELD DATA SECTOR

(75) Inventors: Marvin L. Vis, Longmont, CO (US); Christopher P. Zook, Longmont, CO (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/499,888

(22) Filed: Feb. 8, 2000

(51) Int. Cl.$^7$ ............................................. H03M 13/00

(52) U.S. Cl. ................................................... 714/792

(58) Field of Search ................................. 714/746, 786, 714/769, 792; 360/51–52

(56) References Cited

U.S. PATENT DOCUMENTS

| | | | | |
|---|---|---|---|---|
| 5,291,499 | A | * 3/1994 | Behrens et al. | 714/786 |
| 5,521,945 | A | 5/1996 | Knudson | 375/341 |
| 5,585,975 | A | * 12/1996 | Bliss | 360/65 |
| 5,696,639 | A | * 12/1997 | Spurbeck et al. | 360/51 |
| 5,771,127 | A | * 6/1998 | Reed et al. | 360/51 |
| 5,838,738 | A | * 11/1998 | Zook | 375/340 |
| 5,844,741 | A | 12/1998 | Yamakawa et al. | 360/65 |
| 5,844,920 | A | * 12/1998 | Zook et al. | 714/769 |
| 5,926,490 | A | 7/1999 | Reed et al. | 360/51 |
| 5,938,790 | A | 8/1999 | Marrow | 714/795 |
| 5,949,831 | A | 9/1999 | Coker et al. | 375/341 |
| 5,961,658 | A | * 10/1999 | Reed et al. | 714/746 |
| 6,000,054 | A | 12/1999 | Bahr et al. | 714/786 |
| 6,032,284 | A | * 2/2000 | Bliss | 714/792 |

OTHER PUBLICATIONS

Fitzpatrick, A Reduced Complexity EPR4 post–processor, IEEE, 1–1998, p. 135–140.*

Fields et al., A 200Mb/s CMOS EPRML Channel with intergrated servo Demodulator for Magnetic HArd Disks, IEEE, 1997, p. 314–316.*

Roger Wood, "Turbo–PRML: A Compromise EPRML Detector," *IEEE Transactions on Magnetics*, vol. 29, No. 6, Nov. 1993.

Hideyuki Yamakawa, "SPERD: Simplified Partial Error Response Detection," *IEEE Inter Mag '95*, San Antonio, Texas, Apr. 1995.

(List continued on next page.)

*Primary Examiner*—Albert Decady
*Assistant Examiner*—Shelly A Chase
(74) *Attorney, Agent, or Firm*—Dan Shifrin

(57) ABSTRACT

A sampled amplitude read channel is disclosed for reading a data sector recorded on a disk storage medium by detecting an estimated data sequence from a sequence of read signal sample values generated by sampling an analog read signal emanating from a read head positioned over the disk storage medium, the data sector comprising a user data segment and an embedded field comprising a known data segment. A sampling device samples the analog read signal to generate the read signal sample values and a trellis sequence detector detects a preliminary sequence from the read signal sample values. A post processor detects and corrects errors in the preliminary sequence using a syndrome generator responsive to the preliminary sequence representing the user data segment. The syndrome generator generates an error syndrome according to a predetermined error detection code. A boundary error compensator compensates for a boundary error event spanning the user data segment and the known data segment. A guided error corrector, responsive to the error syndrome, corrects errors detected in the preliminary sequence.

22 Claims, 9 Drawing Sheets

OTHER PUBLICATIONS

Takushi Nishiya, "PERD: Partial Error Response Detection," *IEEE Inter Mag '95*, San Antonio, Texas, Apr. 1995.

Takushi Nishiya and Hideyuki Yamakawa, "PERD: Partial Error Response Detection," *IEEE Transactions on Magentics*, vol. 31, No. 6, Nov. 1995.

McEwen, Wolf, "Trellis Codes for (1,k) E$^2$PR4ML with Squared Distance 18", *IEEE Transactions on Magentics*, vol. 32. No. 5, Sep. 1996..

J. Hagenauer and P. Hoeher, "A Viterbi Algorithm with Soft–Decision Outputs and its Applications", Conference Proceedings, IEEE Globecom, Dallas, TX, Nov., 1989..

Bahl et al, "Optimal Decoding of Linear Codes for Minimizing Symbol Error Rate", *IEEE Trans. on Information Theory*, Mar., 1974.

T. Nishiya et al., "Turbo–EEPRML: An EEPR4 Channel with an Error–Correcting Post–Processor Designed for 16/17 Rate Quasi–MTR Code", *IEEE Globecom*, Nov. 8–12, 1998.

Stephen B. Wicker, *Error Control Systems for Digital Comunication and Storage*, Prentice Hall, pp. 264–332, 1995.

U.S. patent application Ser. No. 08/862,493, to Reed et al., filed May 23, 1997 Patent 5926490.

U.S. patent application Ser. No. 08/127,101 to Livingston, filed Jul. 31, 1998. Patent 6185173.

U.S. patent application Ser. No. 09/307,645 to Livingston, filed May 7, 1999.

* cited by examiner

SAMPLED AMPLITUDE READ CHANNEL EMPLOYING A POST PROCESSOR WITH A BOUNDARY ERROR COMPENSATOR WHICH COMPENSATES FOR BOUNDARY ERROR EVENTS IN A SPLIT-FIELD DATA SECTOR

CROSS REFERENCE TO RELATED APPLICATIONS AND PATENTS

This application is related to concurrently filed U.S. patent application Ser. No. 09/499,930 entitled "AN ERROR DETECTION CONVOLUTION CODE AND POST PROCESSOR FOR CORRECTING DOMINANT ERROR EVENTS OF A TRELLIS SEQUENCE DETECTOR IN A SAMPLED AMPLITUDE READ CHANNEL FOR DISK STORAGE SYSTEMS." This application is also related to other co-pending U.S. patent applications, namely application Ser. No. 09/439,560 entitled "A 2,2,1 ASYMMETRIC PARTIAL RESPONSE TARGET IN A SAMPLED AMPLITUDE READ CHANNEL FOR DISK STORAGE SYSTEMS," and Ser. No. 09/204,759 entitled "A SAMPLED AMPLITUDE READ CHANNEL EMPLOYING ITERATIVE ERROR CORRECTION TECHNIQUES TO MINIMIZE A EUCLIDEAN DISTANCE." This application is also related to U.S. Pat. No. 5,844,920 entitled "THERMAL ASPERITY COMPENSATION USING MULTIPLE SYNC MARKS FOR RETROACTIVE AND SPLIT SEGMENT DATA SYNCHRONIZATION IN A MAGNETIC DISK STORAGE SYSTEM," U.S. Pat No. 5,585,975 entitled "EQUALIZATION FOR SAMPLE VALUE ESTIMATION AND SEQUENCE DETECTION IN A SAMPLED AMPLITUDE READ CHANNEL," U.S. Pat. No. 5,926,490 entitled "SAMPLED AMPLITUDE READ CHANNEL EMPLOYING A REMOD/DEMOD SEQUENCE DETECTOR GUIDED BY AN ERROR SYNDROME," U.S. Pat. No. 5,771,127 entitled "A SAMPLED AMPLITUDE READ CHANNEL EMPLOYING INTERPOLATED TIMING RECOVERY AND A REMOD/DEMOD SEQUENCE DETECTOR," U.S. Pat. No. 5,838,738 entitled "CODING TO IMPROVE TIMING RECOVERY IN A SAMPLED AMPLITUDE READ CHANNEL," U.S. Pat. No. 5,696,639 entitled "SAMPLED AMPLITUDE READ CHANNEL EMPLOYING A REMOD/DEMOD SEQUENCE DETECTOR GUIDED BY AN ERROR SYNDROME," U.S. Pat. No. 6,185,173 entitled "A SAMPLED AMPLITUDE READ CHANNEL EMPLOYING A TRELLIS SEQUENCE DETECTOR MATCHED TO A CHANNEL CODE CONSTRAINT AND A POST PROCESSOR FOR CORRECTING ERRORS IN THE DETECTED BINARY SEQUENCE USING THE SIGNAL SAMPLES AND AN ERROR SYNDROME," and U.S. Pat. No. 5,291,499 entitled "METHOD AND APPARATUS FOR REDUCED-COMPLEXITY VITERBI-TYPE SEQUENCE DETECTORS." The above-named U.S. patent applications and U.S. patents are incorporated herein by reference.

FIELD OF INVENTION

The present invention relates to the recording and reproduction of binary data in disk storage systems for digital computers, particularly to a sampled amplitude read channel employing a post processor with a boundary error compensator which compensates for error events occurring at the boundaries of split-fields within a data sector recorded on a disk storage medium.

BACKGROUND OF THE INVENTION

Post processors in sampled amplitude read channels for disk storage systems provide a significant increase in the effective signal-to-noise ratio (SNR) and thereby provide a significant increase in the linear density and overall storage capacity of disk drives. Sampled amplitude read channels typically employ a trellis sequence detector, such as a Viterbi sequence detector, for detecting a preliminary sequence from synchronous samples of the read signal. The accuracy of the preliminary sequence depends on the magnitude and character of the noise in the read signal; errors are typically due to a particular noise sequence resulting in a dominant error event associated with the trellis sequence detector. Post processors are employed to detect and correct these dominant error events, for example, by evaluating the signal noise to determine when a dominant error event was likely to have occurred. A remodulator remodulates the preliminary sequence into estimated sample values which are subtracted from the actual read signal sample values to generate a sequence of sample errors representing the noise in the read signal. A number of finite impulse response (FIR) filters process the sample errors in order to compute correlation values indicative of the dominant error events associated with the trellis sequence detector.

It is also known to employ an error detection code (EDC) for detecting when an error event occurred within a predetermined number of symbols in the preliminary sequence, and to correct the most likely error event (determined from the correlation values) that is consistent with the EDC error syndrome. For example, in the above-referenced U.S. Patent entitled "SAMPLED AMPLITUDE READ CHANNEL EMPLOYING A REMOD/DEMOD SEQUENCE DETECTOR GUIDED BY AN ERROR SYNDROME" a parity code EDC is employed to detect and correct certain dominant error events of a trellis sequence detector. A more sophisticated convolution code EDC capable of detecting and correcting additional dominant error events undetectable using a parity code EDC is disclosed in the above-referenced U.S. patent entitled "AN ERROR DETECTION CONVOLUTION CODE AND POST PROCESSOR FOR CORRECTING DOMINANT ERROR EVENTS OF A TRELLIS SEQUENCE DETECTOR IN A SAMPLED AMPLITUDE READ CHANNEL FOR DISK STORAGE SYSTEMS."

When a data sector recorded on the disk comprises split-fields (e.g., when employing secondary sync marks or embedded servo sectors) a problem manifests in post processors employing an EDC in that error events occurring at the boundaries of the split-fields may be undetectable by the resulting EDC error syndrome. The EDC check symbols and corresponding error syndrome are typically generated only over the user data of a data sector and therefore any part of an error event extending over a split-field boundary will not be included in the EDC error syndrome. This problem arises both when an error event begins at the end of a user data segment and extends into an embedded field (e.g., into a secondary preamble or an embedded servo sector), and when an error event begins at the end of an embedded field and extends into a following user data segment.

There is, therefore, a need for a sampled amplitude read channel for disk storage systems employing a post processor responsive to an EDC and which compensate for error events occurring at the boundaries of split-fields within a data sector. In particular, there is a need to compensate for error events beginning at the end of a user data segment and extending into an embedded field (e.g., into a secondary preamble or an embedded servo sector), as well as error events beginning at the end of an embedded field and extending into a following user data segment.

SUMMARY OF THE INVENTION

The present invention may be regarded as a sampled amplitude read channel for reading a data sector recorded on a disk storage medium by detecting an estimated data sequence from a sequence of read signal sample values generated by sampling an analog read signal emanating from a read head positioned over the disk storage medium, the data sector comprising a user data segment and an embedded field comprising a known data segment. A sampling device samples the analog read signal to generate the read signal sample values and a trellis sequence detector detects a preliminary sequence from the read signal sample values. A post processor detects and corrects errors in the preliminary sequence using a syndrome generator responsive to the preliminary sequence representing the user data segment. The syndrome generator generates an error syndrome according to a predetermined error detection code. A boundary error compensator compensates for a boundary error event spanning the first user data segment and the known data segment. A guided error corrector, responsive to the error syndrome, corrects errors detected in the preliminary sequence.

The present invention may also be regarded as a method of reading a data sector recorded on a disk storage medium by detecting an estimated data sequence from a sequence of read signal sample values generated by sampling an analog read signal emanating from a read head positioned over the disk storage medium, the data sector comprising a user data segment and an embedded field comprising a known data segment. The analog read signal is sampled to generate the read signal sample values, and the read signal sample values are processed to detect a preliminary sequence. An error syndrome according to a predetermined error detection code is generated in response to the preliminary sequence representing the user data segment. A boundary error event spanning the user data segment and the known data segment is compensated. The error syndrome is used to correct errors detected in the preliminary sequence.

BRIEF DESCRIPTION OF THE DRAWINGS

The above and other aspects and advantages of the present invention will be better understood by reading the following detailed description of the invention in conjunction with the drawings, wherein.

DETAILED DESCRIPTION OF EMBODIMENTS

Partial Response Systems

Partial response (PR) signaling refers to a particular method for transmitting symbols represented as analog pulses through a communication medium. The benefit is that at the signaling instances (baud rate) there is no intersymbol interference (ISI) from other pulses except for a controlled amount from immediately adjacent, overlapping pulses. Allowing the pulses to overlap in a controlled manner leads to an increase in the symbol rate (linear recording density) without losing performance in terms of signal-to-noise ratio (SNR).

Figure 1A:
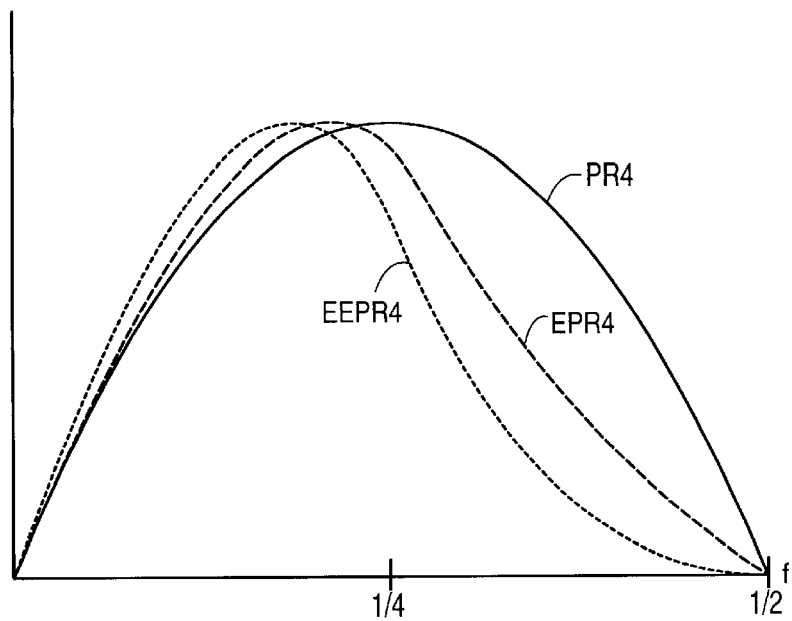
FIG. 1A shows the frequency response for a PR4, EPR4 and EEPR4 read channel.
Figure 1B:
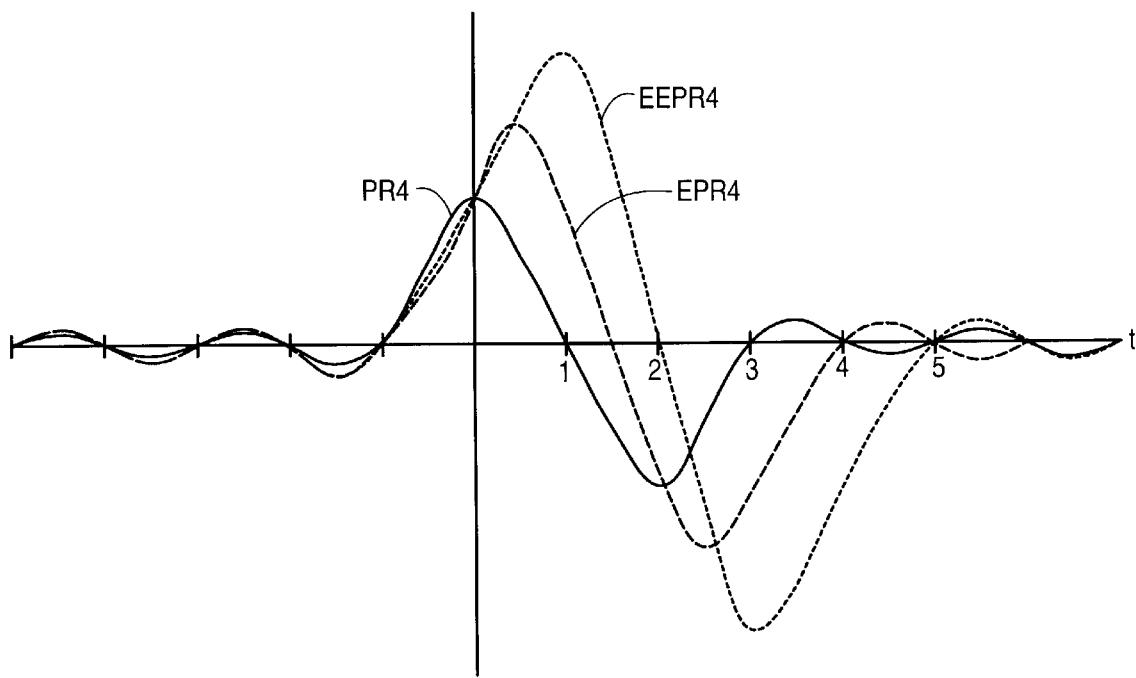
FIG. 1B shows the dipulse responses for the PR4, EPR4 and EEPR4 read channels of FIG. 1A.

PR channels are characterized by the polynomials $$(1-D)(1+D)^n$$

where D represents a delay of one symbol period and n is an integer. For n=1,2,3, the PR channels are referred to as PR4, EPR4 and EEPR4, with their respective frequency responses shown in FIG. 1A. The channel's dipulse response, the response to an isolated symbol, characterizes the transfer function of the system (the output for a given input). With a binary "1" bit modulating a positive dipulse response and a binary "0" bit modulating a negative dipulse response, the output of the channel is a linear combination of time shifted dipulse responses. The dipulse response for a PR4 channel $(1-D^2)$ is shown as a solid line in FIG. 1B. Notice that at the symbol instances (baud rate), the dipulse response is zero except at times t=0 and t=2. Thus, the linear combination of time shifted PR4 dipulse responses will result in zero ISI at the symbol instances except where immediately adjacent pulses overlap.

With the PR4 dipulse samples normalized to (+1, 0 −1) it should be apparent that the linear combination of time shifted PR4 dipulse responses will result in a channel output of +2, 0, or −2 at the symbol instances depending on the binary input sequence. The output of the channel can therefore be characterized as a state machine driven by the binary input sequence, and conversely, the input sequence can be estimated or demodulated by running the signal samples at the output of the channel through an "inverse" state machine. Because noise will obfuscate the signal samples, the inverse state machine is actually implemented as a trellis sequence detector which computes a most likely input sequence associated with the signal samples (i.e., the sequence through a trellis that is closest to the signal samples in Euclidean space).

Data Format

Figure 2A:
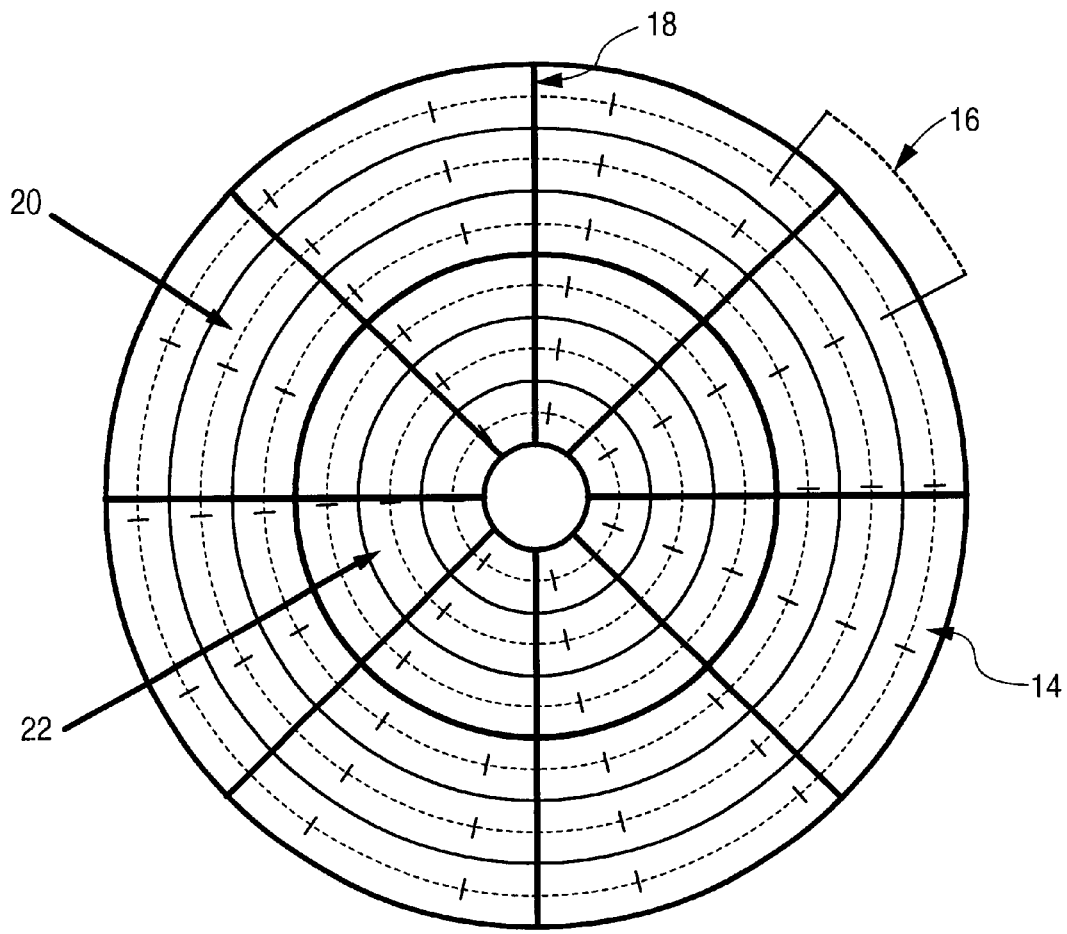
FIG. 2A shows a typical data format for a magnetic disk storage medium, comprising a plurality of concentric data tracks grouped in predefined zones, where each data track is partitioned into a number of data sectors.

FIG. 2A shows a conventional data format of a magnetic disk storage medium comprising a series of concentric, radially spaced data tracks 14, wherein each data track 14 comprises a plurality of data sectors 16 with embedded servo wedges 18. A servo controller (not shown) processes the servo data in the servo wedges 18 and, in response, positions a read/write head over a selected data track. Additionally, the servo controller processes servo bursts within the servo wedges 18 to keep the head aligned over a centerline of the selected track while writing and reading data. The format of the servo wedges 18 includes a preamble and a sync mark, similar to the user data sectors 16 described below with reference to FIG. 2B.

Zoned recording is a technique known in the art for increasing the storage density by recording the user data at different rates in predefined zones between the inner diameter and outer diameter tracks. The data rate can be increased at the outer diameter tracks due to the increase in circumferential recording area and the decrease in intersymbol interference. This allows more data to be stored in the outer diameter tracks as is illustrated in FIG. 2A where the disk is partitioned into an outer zone 20 comprising fourteen data sectors per track, and an inner zone 22 comprising seven data sectors per track. In practice, the disk is actually partitioned into several zones with increasing data rates from the inner to outer diameter zones.

Figure 2B:
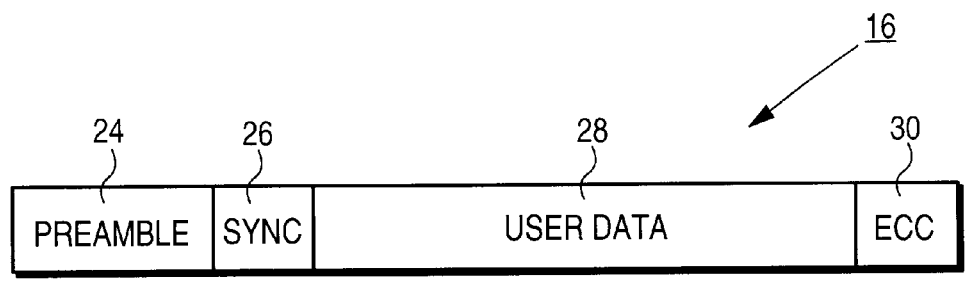
FIG. 2B shows a typical format for a data sector.

FIG. 2B shows the format of a data sector 16 comprised of an acquisition preamble 24, a sync mark 26, a user data field 28, and appended ECC bytes 30 for use in detecting and correcting errors in the user data upon readback. Timing recovery 68 of FIG. 3 processes the acquisition preamble 24 to acquire the correct data frequency and phase before reading the user data field 28, and the sync mark 26 demarks the beginning of the user data field 28 for use in symbol synchronizing the user data 28. The user data 28 are further encoded using an EDC for enhancing the performance of a post processor 95 shown in FIG. 3 and as described in greater detail below.

Sampled Amplitude Read Channel

Figure 3:
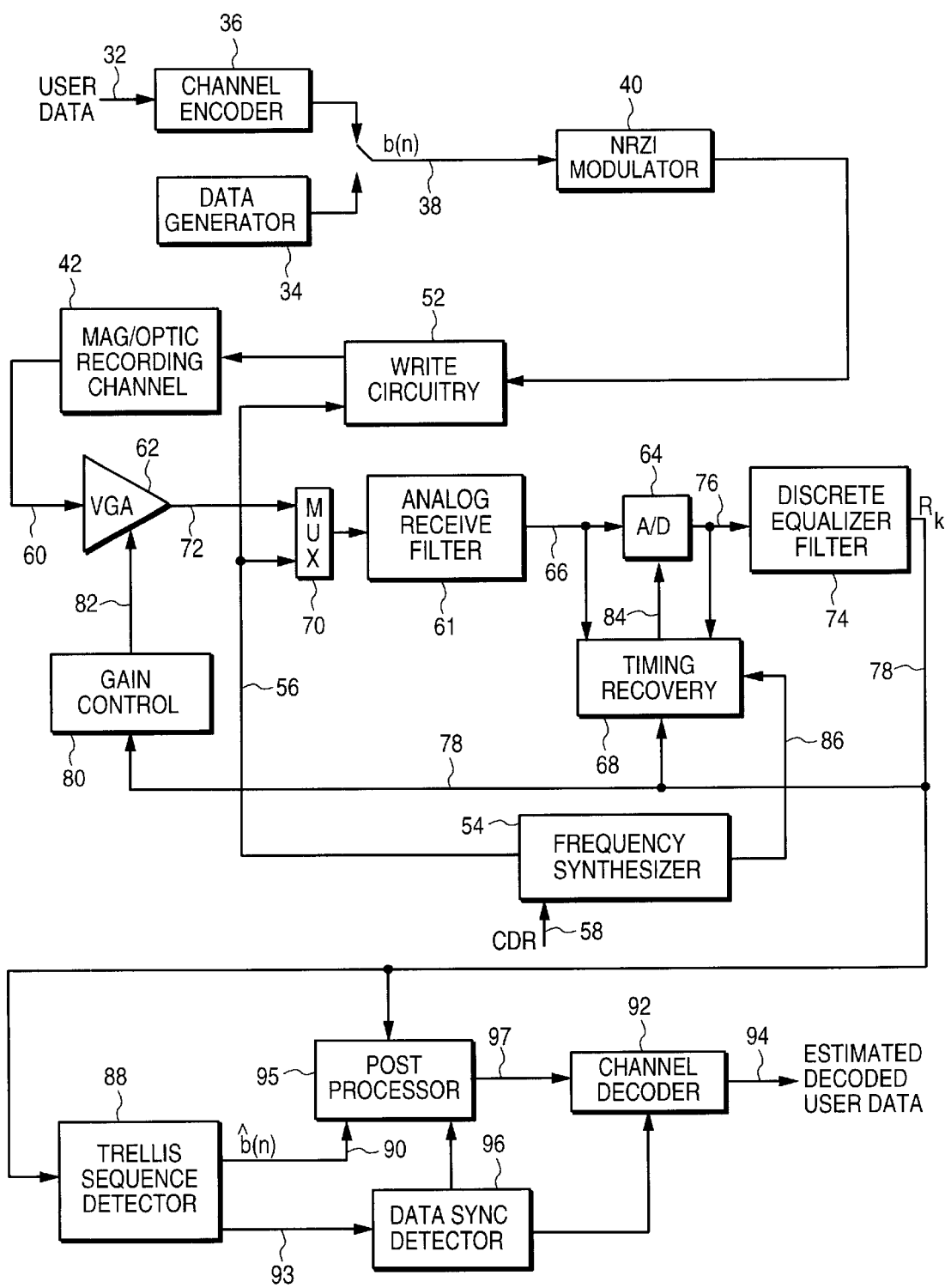
FIG. 3 shows a block diagram of a sampled amplitude read channel employing a trellis sequence detector and a post processor according to an embodiment of the present invention.

Referring now to FIG. 3, shown is a block diagram of a sampled amplitude read channel according to an embodiment of the present invention. During a write operation, the read channel receives user data over line 32 from the host system. A data generator 34 generates the preamble 24 of FIG. 2B (for example 2T preamble data) written to the disk prior to writing the user data 28. The data generator 34 also generates the sync mark 26 of FIG. 2B for use in symbol synchronizing to the user data 28 during a read operation. A channel encoder 36 encodes a channel code into the data sequence b(n) 38 which is written to the disk; a suitable channel encoder 36 encodes the user data to enforce a run-length-limited (RLL) (d,k) constraint as well as to encode EDC check bits for use by the post processor 95 it in correcting errors made by the trellis sequence detector 88. An example of a suitable channel encoder 36 is provided in the above-referenced U.S. Pat. No. 5,926,490.

After encoding 36 the channel code, a NRZI modulator 40 modulates the current of write circuitry 52, thereby modulating the current in the recording head coil (or intensity of a laser beam) at the zone baud rate to record a sequence of transitions onto the disk 42 which represent the recorded data. In NRZI recording, for each "1" bit in the write data sequence b(n) 38 the NRZI modulator 40 toggles the write current (from positive to negative, or vise versa), and for each "0" bit in the write data sequence b(n) 38 the NRZI modulator 40 leaves the write current unchanged. A frequency synthesizer 54 provides a baud rate write clock 56 to the write circuitry 52 which is adjusted by a baud or channel data rate signal (CDR) 58 according to the current zone the recording head is over.

When reading the recorded binary sequence from the disk storage medium 42, timing recovery 68 first locks to the write frequency of the zone by selecting, as the input to the read channel, the write clock 56 through a multiplexer 70. Once locked to the write frequency, which is the nominal sampling frequency, the multiplexer 70 selects the signal 72 from the read head as the input to the read channel in order to acquire the acquisition preamble 24 recorded on the disk prior to the recorded user data 28 as shown in FIG. 2B. A variable gain amplifier 62 adjusts the amplitude of the analog read signal 60, and an analog receive filter 61 provides initial equalization toward the desired response as well as attenuating aliasing noise. A sampling device 64 samples the analog read signal 66 from the analog filter 61, and a discrete-time equalizer filter 74 provides further equalization of the sample values 76 toward the desired response. Table 1 shows normalized values for the PR4, EPR4 and EEPR4 dipulse responses of FIG. 1B:

TABLE 1

| Channel | Transfer Function | Dipulse Response |
| --- | --- | --- |
| PR4 | $(1 - D) (1 + D)$ | 0, 1, 0, −1, 0, 0, 0, . . . |
| EPR4 | $(1 - D) (1 + D)^2$ | 0, 1, 1, −1, −1, 0, 0, . . . |
| EEPR4 | $(1 - D) (1 + D)^3$ | 0, 1, 2, 0, −2, −1, 0, . . . |

The discrete-time equalizer filter 74 may be implemented as a real-time adaptive filter which compensates for parameter variations over the disk radius (i.e., zones), disk angle, and environmental conditions such as temperature drift.

After equalization, the equalized sample values $R_k$ 78 are applied to a decision directed gain control 80 and timing recovery 68 circuit for adjusting the amplitude of the read signal 60 and the frequency and phase of the sampling device 64, respectively. Gain control 80 adjusts the gain of variable gain amplifier 62 over line 82 in order to match the magnitude of the channel's frequency response to the desired PR target, and timing recovery 68 adjusts the frequency of sampling device 64 over line 84 in order to synchronize the equalized samples 78 to the baud rate. Frequency synthesizer 54 provides a course center frequency setting to the timing recovery circuit 68 over line 86 in order to center the timing recovery frequency over temperature, voltage, and process variations. An alternative embodiment for synchronizing the read signal samples to the baud rate is to sample the analog read signal 66 asynchronously and to interpolate the asynchronous sample values to synchronous sample values as described in the above referenced U.S. Pat. No. 5,771,127, "A SAMPLED AMPLITUDE READ CHANNEL EMPLOYING INTERPOLATED TIMING RECOVERY AND A REMOD/DEMOD SEQUENCE DETECTOR."

The sampling device 64 is shown in FIG. 3 as an analog-to-digital (A/D) converter. However, those skilled in the art understand that the sampling device 64 could be a simple sample and hold circuit for converting the analog read signal 66 into a sequence of discrete-time analog samples, and the downstream circuitry, such as the discrete-time equalizer filter 74, timing recovery 68, gain control 80, etc., could be implemented using conventional discrete-time analog (DTA) circuitry. In an alternative embodiment the read channel could be implemented using a hybrid of DTA and digital circuits; for example, the discrete-time equalizer filter 74 could be implemented using DTA, the equalized sample values 78 converted to digital values, and the sequence detector 88 implemented using digital circuitry.

In one embodiment of the present invention the discrete-time equalizer 74 equalizes the sample values 76 into a PR4 response so that a simple slicer circuit (not shown) can generate estimated sample values for use in the timing recovery 68 and gain control 80 decision-directed feedback loops. The PR4 equalized samples 78 are then passed through a target filter to generate target samples according to the PR target of the trellis sequence detector 88. For implementation details concerning various alternative embodiments for sample value estimation for timing recovery 68 and gain control 80, see the above referenced U.S. Pat . No. 5,585,975, "EQUALIZATION FOR SAMPLE VALUE ESTIMATION AND SEQUENCE DETECTION IN A SAMPLED AMPLITUDE READ CHANNEL."

The synchronous, equalized channel samples 78 are ultimately input into a trellis sequence detector 88 which detects a preliminary sequence $\hat{b}(n)$ 90 from the channel samples 78. A post processor 95 processes the preliminary sequence $\hat{b}(n)$ 90 to detect and correct the most likely errors made by the trellis sequence detector 88. In one embodiment, the post processor 95 remodulates the preliminary sequence $\hat{b}(n)$ 90 into a sequence of estimated sample values corresponding to the target partial response. The estimated sample values are subtracted from the actual read signal sample values to generate a sequence of sample error values. The sample error values (which represent the noise in the read signal) are then processed to detect dominant error events made by the trellis sequence detector 88. An error syndrome is generated from the user data and EDC check bits in the preliminary sequence; when the error syndrome indicates the presence of an error, the post processor corrects the most likely error event that is consistent with the error syndrome.

In one embodiment, the EDC is a parity code in the NRZ domain which is capable of detecting a certain number of dominant error events. In an alternative embodiment, the EDC is a more sophisticated convolution code capable of detecting significantly more dominant error events. In yet another embodiment, the post processor 95 makes a first pass over the preliminary sequence $\hat{b}(n)$ 90 to correct errors caused by the noise correlating effect of the channel equalizers, and then corrects residual errors using the convolution code EDC.

The post processor 95 further employs a boundary error compensator which compensates for error events occurring at the boundaries of split-fields within a data sector (e.g., at the boundaries of an embedded field). In one embodiment, when a boundary error event is detected the EDC error syndrome is updated and the updated error syndrome is used to correct the detected boundary error event. In an alternative embodiment, a known data sequence corresponding to a known data segment of an embedded field is remodulated into corresponding estimated sample values and subtracted from the read signal samples to form the sequence of sample errors representing the noise in the read signal which effectively cancels that part of the error event extending into the embedded field.

The corrected binary sequence 97 output by the post processor 95 is decoded by a channel decoder 92 which implements the inverse operation of the channel encoder 36 to thereby generate an estimated user data sequence 94. A data sync detector 96 detects the sync mark 26 (shown in FIG. 2B) in the data sector 16 in order to frame operation of the post processor 95 and the channel decoder 92. In one embodiment, the sync mark detector 96 detects the sync mark 26 early by processing an estimated data sequence 93 output four bits prior to the end of the path memory in the trellis sequence detector 88. A detailed description of the trellis sequence detector 88 and post processor 95, including the performance enhancing aspects of the boundary error compensator, is described in greater detail in the following sections.

Trellis Sequence Detector

Figure 4A:
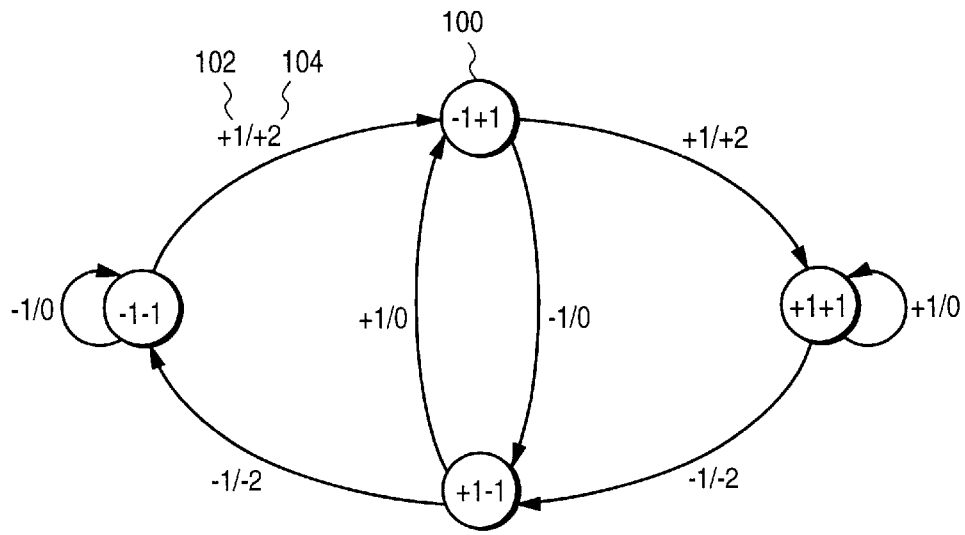
FIG. 4A is a state transition diagram for a PR4 sequence detector.

The general operation of the trellis sequence detector 88 shown in FIG. 3 is understood from the state transition diagram for a simple PR4 sequence detector shown in FIG. 4A. Each state 100 is represented by the last two input symbols in the NRZ domain (a "1" bit corresponds to a positive write current and a "0" bit corresponds to a negative write current), and each branch from one state to another is labeled with the current input symbol in NRZ 102 and the corresponding sample value 104 it will produce during readback. The demodulation process of the PR4 sequence detector is understood by representing the state transition diagram of FIG. 4A as a trellis diagram shown in FIG. 4B. The trellis diagram represents a time sequence of sample values and the possible recorded input sequences that could have produced the sample sequence. For each possible input sequence, an error metric is computed relative to a difference between the sequence of expected sample values that would have been generated in a noiseless system and the actual sample values output by the channel. For instance, a Euclidean metric is computed as the accumulated square difference between the expected and actual sample values. The input sequence that generates the smallest Euclidean metric is the most likely sequence to have created the actual sample values because it is the "closest" valid sequence to the actual sample values; this sequence is therefore selected as the output of the sequence detector.

To facilitate the demodulation process, the sequence detector comprises path memories for storing each of the possible input sequences and a corresponding metric. A well known property of the sequence detector is that the paths storing the possible input sequences will "merge" into a most likely input sequence after a certain number of sample values are processed, as long as the input sequence is appropriately constrained through use of a channel code. In fact, the maximum number of path memories needed equals the number of states in the trellis diagram; the most likely input sequence will always be represented by one of these paths, and these paths will eventually merge into one path (i.e., the most likely input sequence) after a certain number of sample values are processed.

Figure 4B:
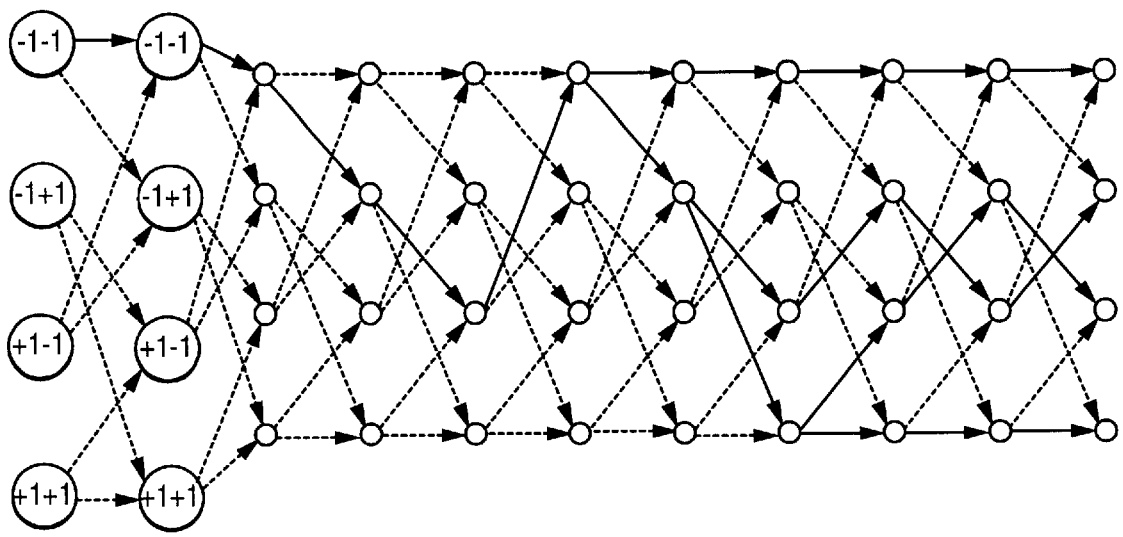
FIG. 4B is a trellis diagram corresponding to the PR4 state transition diagram of FIG. 4A showing the path memory and survivor sequence for a given input sequence.

The "merging" of path memories is understood from the trellis diagram of FIG. 4B where the "survivor" sequences are represented as solid lines. Notice that each state in the trellis diagram can be reached from one of two states; that is, there are two transition branches leading to each state. With each new sample value, the Viterbi algorithm recursively computes a new error metric and retains a single survivor sequence for each state corresponding to the minimum error metric. In other words, the Viterbi algorithm will select one of the two input branches into each state since only one of the branches will correspond to the minimum error metric, and the paths through the trellis corresponding to the branches not selected will merge into the paths that were selected. Eventually, all of the survivor sequences will merge into one path through the trellis which represents the most likely estimated data sequence to have generated the sample values as shown in FIG. 4B.

In some cases, if the input sequence is not appropriately constrained through the use of a channel code, the path memories will not merge into one survivor sequence. Consider the PR4 trellis shown in FIG. 4B; an input sequence of all zeros or all ones will prevent the paths from merging which leads to multiple possible survivor sequences output by the detector. Data sequences which prevent the path memories from merging are referred to as "quasi-catastrophic" data sequences since they result in quasi-catastrophic errors in the output sequence. In order to avoid quasi-catastrophic errors, a channel code is typically employed which codes out of the recorded data all sequences which can prevent the path memories from merging.

Even if the quasi-catastrophic data sequences are coded out of the input sequence, the sequence detector can still make an error in detecting the output sequence if enough destructive noise is present in the read signal. The possible output sequences are different from one another by a minimum Euclidean distance; a detection error typically occurs when the signal noise breaches this minimum distance between valid output sequences. A minimum distance error event can occur where the data sequences diverge from a particular state in the trellis and then remerge at a later state. In a perfect system (a system with additive white Gaussian noise), all of the minimum distance error events will occur with equal probability. However, because the channel equalizers correlate the noise in the read signal samples, the shorter length, minimum distance error events are more likely to occur. Further, depending on the partial response polynomial and recording density employed, error events other than the minimum distance error events may become the most dominant.

An increase in performance can be achieved by employing a channel code to code out data sequences associated with the minimum distance error events (similar to coding out the quasi-catastrophic data sequences), and then to match the sequence detector to this channel code using conventional trellis coded modulation (TCM) techniques. For example, the minimum distance error events of a PR4 sequence detector can be coded out by removing the bit sequences consisting of (1,0,1) or (0,1,0) from the input sequence. The state machine of a PR4 sequence detector can then be matched to this code constraint by removing the inner branches shown in FIG. 4A. With these branches removed, the minimum distance of the PR4 sequence detector increases from $dmin^2=2$ to $dmin^2=4$ (with the signal samples normalized to +1, 0, −1).

Although matching the trellis state machine to a channel code constraint often provides a significant increase in detector performance, there are certain drawbacks. For instance, employing a simple RLL d=1 constraint to code out the inner branches of the PR4 state machine shown in FIG. 4A typically requires a code rate of 2/3 which is a significant reduction in bandwidth. More complex channel codes with higher code rates can be employed, but this usually increases, significantly, the cost and complexity of matching the state machine of the trellis sequence detector to the code constraint. One aspect of the present invention, then, is to employ a high rate channel code and a post processor 95 which approximate the performance enhancing gain provided by matching the trellis state machine to the channel code constraint, but with a significant reduction in cost and complexity.

Another aspect of the present invention is to design the post processor 95 to compensate for error events occurring at the boundaries of split-fields within a data sector. Boundary error events can occur in split-field data sectors, such as data sectors comprising secondary sync marks or embedded servo sectors. To facilitate detecting boundary error events, the present invention employs a known data segment at the boundaries of the embedded fields. A boundary error event is detected when the preliminary data sequence 90 output by the trellis sequence detector 88 does not match the expected sequence for the known data segment.

Boundary Error Events

Figure 5A:
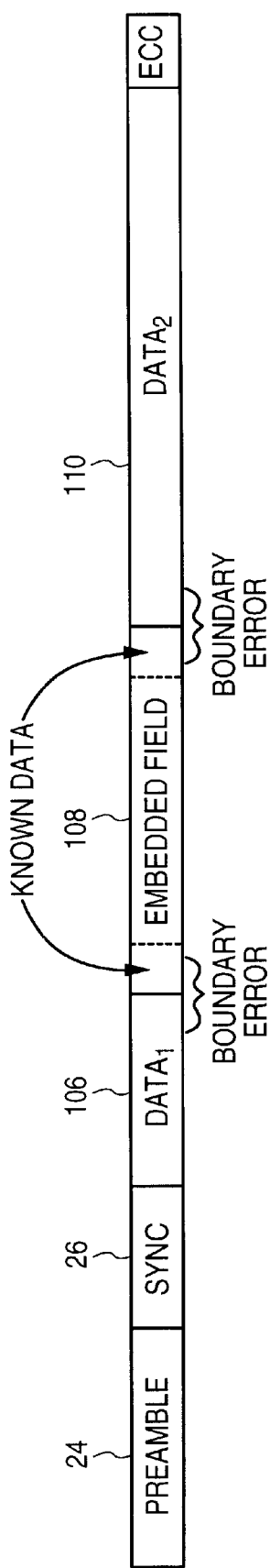
FIG. 5A illustrates a split-field within a data sector, wherein the embedded field comprises known data which facilitates detecting boundary error events.

Referring now to FIG. 5A, shown is a data sector comprising a first user data segment 106, an embedded field 108 comprising known data segments at the boundaries, and a second user data segment 110. In this example, the known data segments are part of an embedded field 108 which "splits" the user data field of the data sector. The post processor 95 EDC check bits and corresponding error syndromes are generated only over the user data segments 106 and 110 and not over the data in the embedded field 108. Thus, a boundary error event beginning at the end of the first user data segment 106 and extending into the embedded field 108, or beginning at the end of the embedded field 108 and extending into the second user data segment 110, may not be detectable by the resulting EDC error syndrome. However, because the embedded field 108 comprises known data at the boundaries, a boundary error event is detectable by comparing the preliminary sequence 90 output by the trellis sequence detector 88 with the expected sequence for the known data.

Figure 5B:
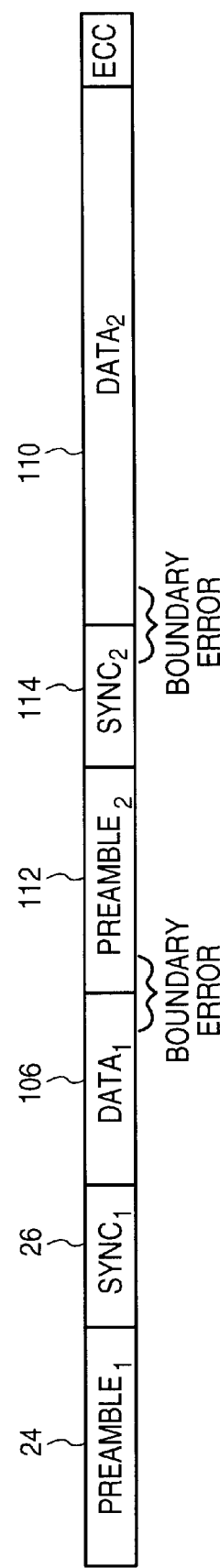
FIG. 5B illustrates a split-field within a data sector wherein the embedded field comprises a secondary preamble and secondary sync mark comprising known data.

FIG. 5B shows an example split-field data sector wherein the embedded field 108 comprises a secondary preamble 112 and a secondary sync mark 114. Secondary sync marks are typically employed in disk storage systems to augment the primary sync mark 26; that is, if the primary sync mark 26 is undetectable due, for instance, to a thermal asperity, the data sector can still be symbol synchronized using the secondary sync mark 114. A secondary preamble 112 is also typically employed to acquire the appropriate gain and timing information before attempting to detect the secondary sync mark 114. The secondary preamble 112 as well as the secondary sync mark 114 comprise known data. For example, the secondary preamble 112 typically comprises the well known 2T acquisition pattern, and the secondary sync mark 114 typically comprises a predetermined fault tolerant pattern. Because the data in both the secondary preamble 112 and secondary sync mark 114 is known, a boundary error event can be detected when the preliminary sequence 90 output by the trellis sequence detector 88 does not match the expected sequence associated with the known data.

Figure 5C:
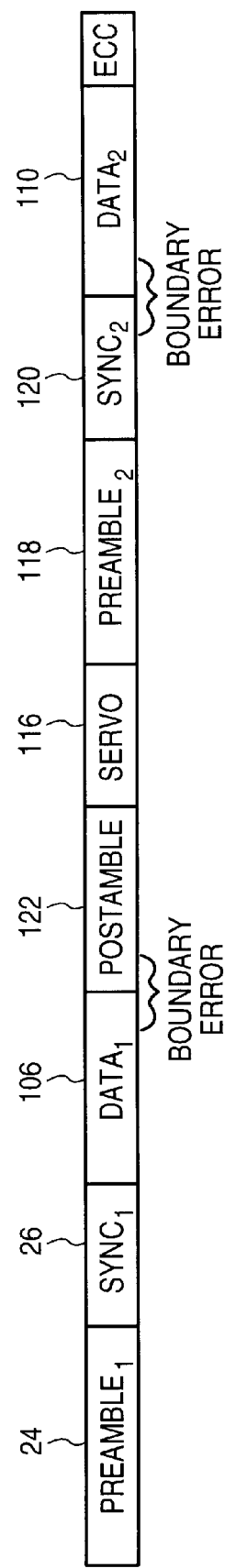
FIG. 5C illustrates a split-field within a data sector wherein the embedded field comprises a postamble (known data), servo data, a secondary preamble, and a secondary sync mark (known data).

Another example of a split-field data sector is shown in FIG. 5C. In this example, the embedded field 108 comprises an embedded servo sector 116 typically recorded at a different data rate than the user data segments 106 and 110. In FIG. 5B, the secondary preamble 112 and secondary sync mark 114 in the embedded field 108 are recorded contiguously at the same data rate as the user data segments 106 and 110. Thus, the trellis sequence detector 88 operates continuously through the embedded field 108 and the detected preliminary sequence 90 is used to detect boundary error events. However, embedded servo sectors are not recorded contiguously with the user data field but "interrupt" the user data field (as well as the data processing). Therefore, an embedded servo sector 116 is typically followed by a secondary preamble 118 and secondary sync mark 120 for use in resynchronizing to the following user data segment 110. To facilitate the boundary error detection technique of the present invention, a postamble 122 comprising known data is recorded at the end of the first user data segment 106. The postamble 122 serves to "close" the trellis sequence detector 88, as well as comprising known data for use in detecting boundary error events.

Figure 6A:
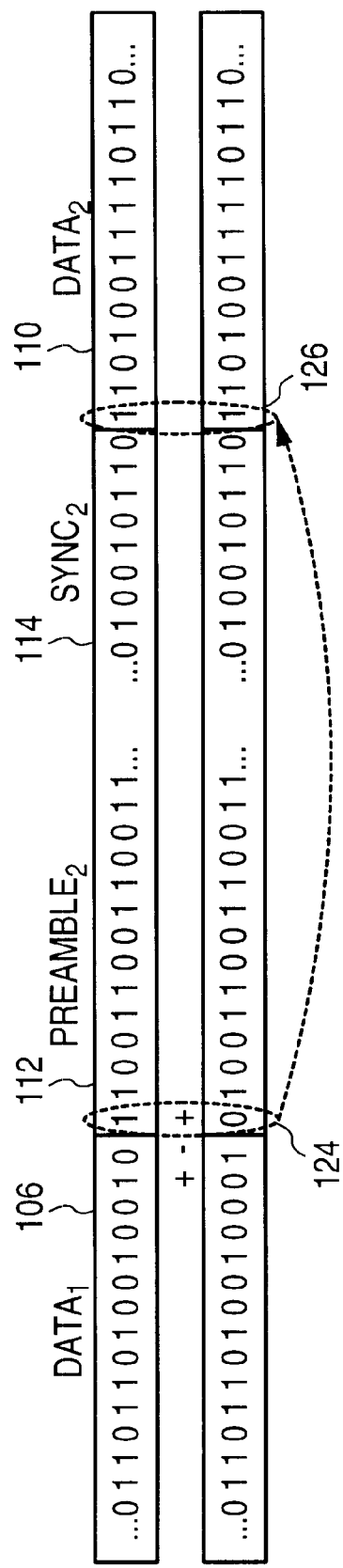
FIG. 6A illustrates a boundary error event beginning at the end of a first user data segment and extending into a secondary preamble (known data segment).
Figure 6B:
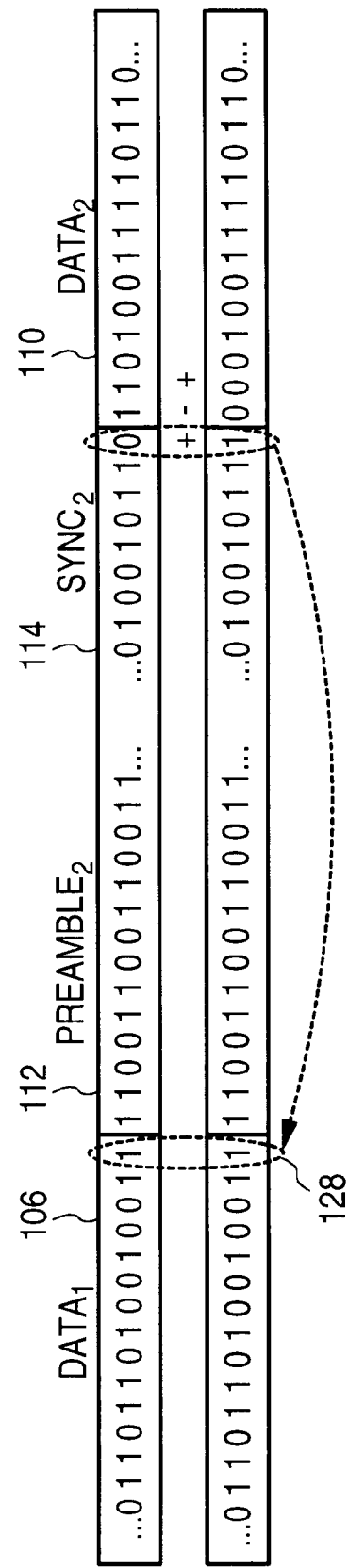
FIG. 6B illustrates a boundary error event beginning at the end of a secondary sync mark (known data segment) and extending into a second user data segment.

The effect that a boundary error event has on the split-field data sector of FIG. 5B is illustrated in FIGS. 6A and 6B which show detected data sequences in the NRZ domain (flux domain) corrupted by a (+−+) error event. The top sequence is the error free sequence, and the bottom sequence shows the effect of the (+−+) error event. In FIG. 6A, the (+−+) error event begins in the first user data segment 106 and extends into a secondary preamble 112. The EDC check bits and corresponding error syndrome are generated over user data bits in both the first and second user data segments 106 and 110 but excluding the secondary preamble and sync mark 112 and 114. Thus, the first bit 124 of the secondary preamble 112 which is toggled by the (+−+) error event will not be included in the EDC error syndrome. However, the presence of a boundary error event can be detected by comparing the preliminary sequence 90 output by the trellis sequence detector 88 to the expected sequence. For example, in FIG. 6A a boundary error event is detected at the beginning of the secondary preamble 112 because the detected sequence 010011001100 . . . does not match the expected sequence 110011001100 . . . The EDC error syndrome can therefore be updated by using the difference between the detected and expected sequences. For example, if the EDC is a parity code, then the EDC parity error syndrome can be updated by XORing it with the parity over the difference (XOR) between the detected and expected sequences for the known data. In the example of FIG. 6A, the parity error syndrome would be updated by XORing it with a "1" since the parity over the difference (100000 . . . ) is "1".

Once the EDC error syndrome has been updated based on the detected boundary error event, the updated error syndrome is used to detect the most likely error event associated with the updated error syndrome. The most likely error event could occur anywhere within the data sector, including completely within the known data segment (e.g., within the secondary preamble 112). In other words, the boundary error event may begin with the first bit of the known data segment and not corrupt any of the data in the first user data segment 106. Further, it is generally not possible to determine which error event occurred at the boundary using only the difference between the detected and expected data sequence in the known data segment. For example, the error in the secondary preamble 112 of FIG. 6A could be caused by several of the dominant error events, not just the (+−+) error event.

Therefore, when a boundary error event is detected, the error syndrome is simply updated and another means is employed to detect the most likely error event that is consistent with the updated error syndrome. In the embodiment disclosed below, a sample error sequence representing the noise in the read signal is generated and processed to determine the most likely error event.

When the most likely error event is corrected, the correction value that corresponds to the part of the error event extending into the known data segment is not applied to the corresponding data in the user data field. For example, when the (+−+) error event in FIG. 6A is corrected the first bit 126 of the second user data segment 110 is left unchanged even though the EDC error syndrome was updated as if that bit had been toggled.

FIG. 6B shows the same (+−+) error event beginning at the end of the known data segment (end of the secondary sync mark 114) and extending into the second user data segment 110. The boundary error event is detected since the detected data sequence does not match the expected data sequence of the known sync mark 114 data. The EDC error syndrome is updated, for example, by XORing the parity over the difference (XOR) between the detected and expected data sequences. The correction value corresponding to the (+−+) error event is applied only to the first two bits of the second user data segment 110 with the last bit 128 of the first user data segment 106 left unchanged.

It is possible to have two boundary error events, one at both ends of the embedded field. In this situation, both error events could be detected and the EDC error syndrome updated using the procedure described above, and both error events could be corrected as long as the EDC is capable of detecting multiple error events.

Post Processor

Figure 7:
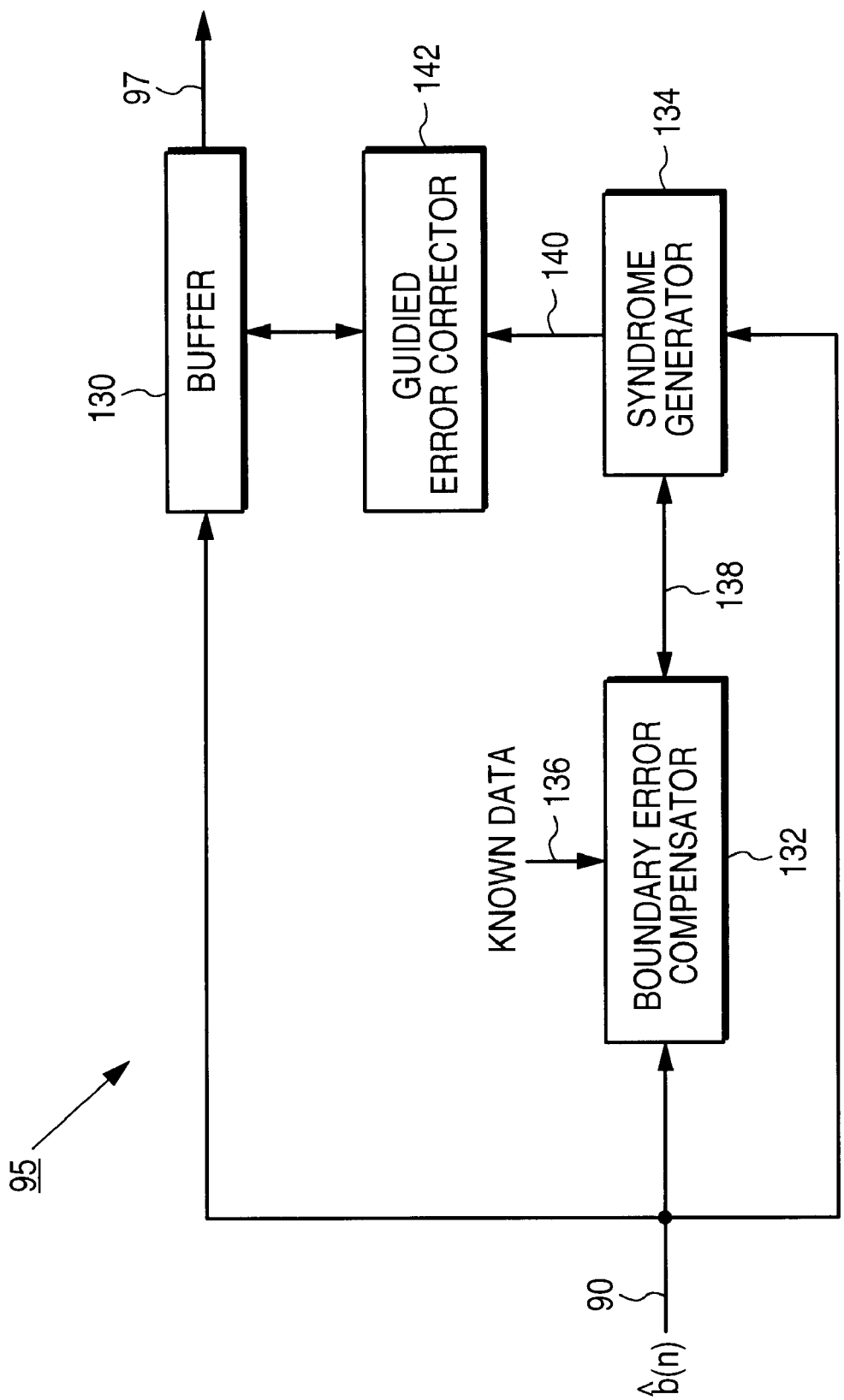
FIG. 7 shows a block diagram of a post processor according to an embodiment of the present invention comprising a boundary error compensator for detecting boundary error events, a syndrome generator for generating an error syndrome in response to the detected preliminary sequence, wherein the error syndrome is updated in response to a detected boundary error event, and a guided error corrector, responsive to the updated error syndrome, for correcting the detected boundary error event.

A suitable embodiment for the post processor 95 of FIG. 3 is provided in FIG. 7. The preliminary sequence 90 output by the trellis sequence detector 88 is input into a buffer 130, a boundary error compensator 132 and a syndrome generator 134. The buffer 130 preferably stores only the user data segments of the user data field and not the data in the embedded fields. The boundary error compensator 132 compares the detected preliminary sequence 90 to a known data sequence 136 (e.g., a known preamble or a known sync mark) in order to detect the occurrence of boundary error events. The syndrome generator 134 generates an error syndrome over the user data segments of the data sector (excluding the embedded fields). When a boundary error event is detected by the boundary error compensator 132, the error syndrome is updated over line 138. The updated error syndrome is then transferred over line 140 to a guided error corrector 142 which detects and corrects the most likely error event consistent with the updated error syndrome. The corrected sequence 97 is then transferred out of the buffer 130 for decoding by the channel decoder 92 of FIG. 3.

Figure 8:
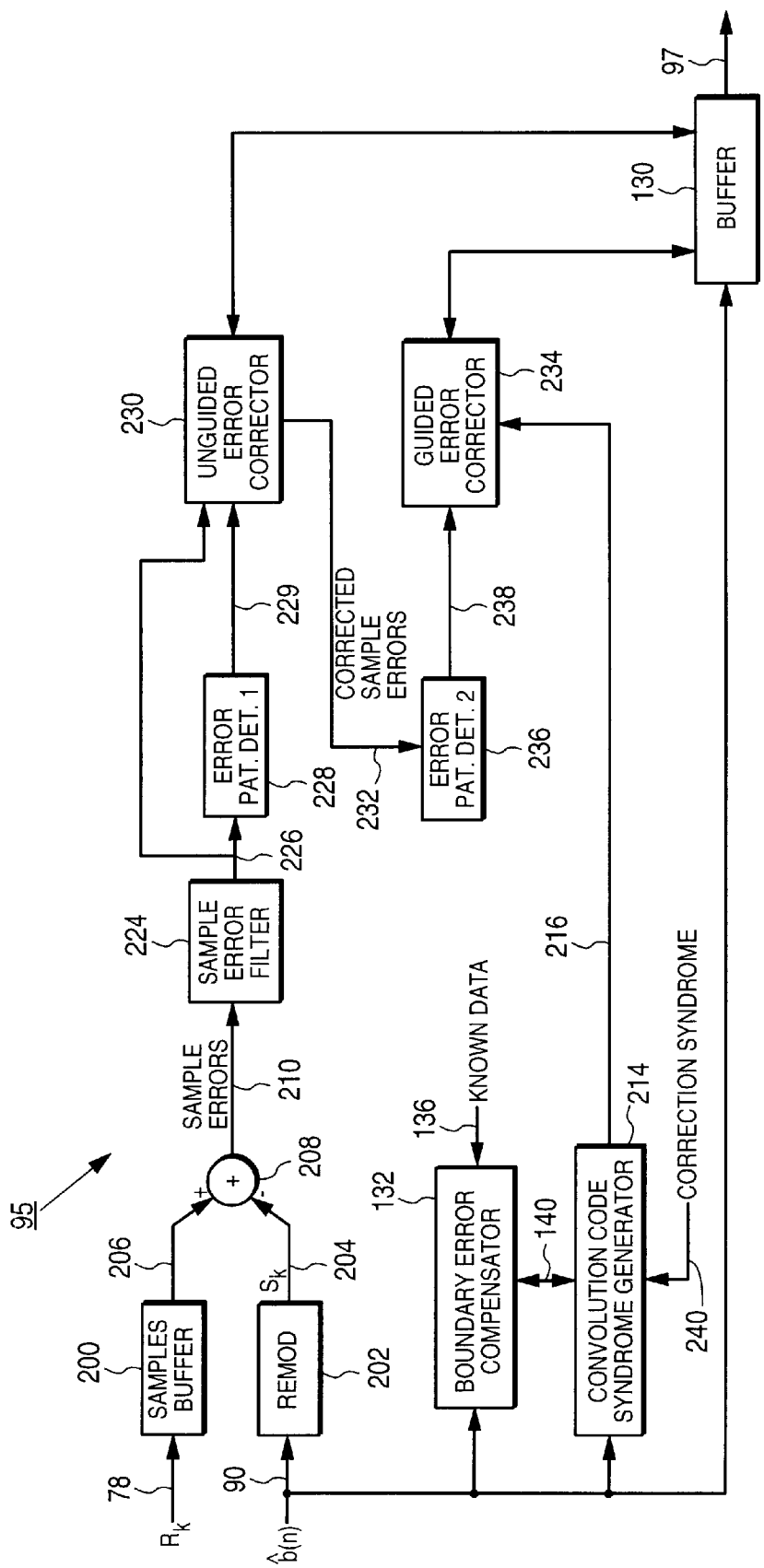
FIG. 8 shows a post processor according to an alternative embodiment of the present invention which employs a convolution code EDC together with first and second error pattern detectors and error correctors for detecting and correcting error events in response to the updated error syndrome.

The error detection and correction based on the updated error syndrome may be carried out by remodulating the preliminary sequence 90 into a sequence of estimated sample values which are subtracted from the actual read signal sample values to generate a sequence of sample errors representing the noise in the read signal. The sample errors (i.e., the noise) are processed to determine the most likely error event in the preliminary sequence 90. A post processor 95 implementing this embodiment of the present invention is illustrated in FIG. 8. A detailed description of the post processor 95 of FIG. 8 is provided in the above-referenced U.S. patent entitled "AN ERROR DETECTION CONVOLUTION CODE AND POST PROCESSOR FOR CORRECTING DOMINANT ERROR EVENTS OF A TRELLIS SEQUENCE DETECTOR IN A SAMPLED AMPLITUDE READ CHANNEL FOR DISK STORAGE SYSTEMS." In general, the post processor 95 shown in FIG. 8 operates as follows.

The read signal sample values $R_k$ 78 are stored in a samples buffer 200 to account for the delay in the trellis sequence detector 88 of FIG. 3. A remodulator 202 remodulates the preliminary sequence 90 detected by the trellis sequence detector 88 into a sequence of estimated sample values $S_k$ 204 of a PR target (e.g., a PR4 target). The estimated sample values $S_k$ 204 are then subtracted from the delayed read signal sample values 206 at adder 208 to form a sequence of sample errors 210. The sample errors 210 are filtered by a sample error filter 224 which effectively whitens the noise in the read signal samples 78 after equalization to compensate for the noise correlating effect of the channel equalizers. The filtered sample errors 226 are processed by a first error pattern detector 228 which detects error events that will reduce the Euclidean distance between a corrected data sequence and a valid output sequence as compared to the preliminary sequence 90 originally detected by the trellis sequence detector 88. The detected error events 229 are then used to correct the preliminary sequence 90 as well as the filtered sample error sequence 226. The corrections are performed by an unguided error corrector 230 which may verify that the corrections are consistent with the RLL constraints before making the corrections. In effect, the post processor 95 better approximates a true ML detector by detecting (i.e., correcting) the estimated data sequence in whitened noise.

After correcting all of the error events that will result in a reduction of the Euclidean distance, residual errors detected by an error syndrome 216 of a convolution code EDC are corrected by a guided error corrector 234. A second error pattern detector 236 processes the corrected sample error sequence 232 to again detect a plurality of dominant error events 238 associated with the trellis sequence detector 88 which are consistent with errors detectable by the convolution code EDC. The guided error corrector 234 then corrects the detected error event 238 that will minimize the Euclidean distance.

A convolution code syndrome generator 214 processes the preliminary sequence 90 detected by the trellis sequence detector 88 to generate an error syndrome 216 according to the convolution code. When the error syndrome 216 indicates the presence of an error in the preliminary sequence 90, the guided error corrector 234 corrects the most likely error event 238 detected by the error pattern detector 236 that is consistent with the error syndrome 216. The guided error corrector 234 may also verify the validity of a correction with respect to the RLL constraints described above. A correction syndrome 240 corresponding to the corrections made to the preliminary sequence 90 by the unguided error corrector 230 are processed by the convolution code syndrome generator 214 to update the error syndrome 216 of the convolution code before processing by the guided error corrector 234.

The boundary error compensator 132 compares the preliminary sequence 90 output by the trellis sequence detector 88 to a known data sequence (e.g., known preamble or sync mark) to detect the boundary error events. When a boundary error event is detected, the convolution code error syndrome is updated over line 140 using a "correction syndrome" similar to the correction syndrome 240 corresponding to the corrections made to the preliminary sequence 90 by the unguided error corrector 230.

In order to simplify the implementation, a data sector is split only at the end of a codeword in the convolution code embodiment. This restriction also facilitates an alternative embodiment for the post processor 95 wherein instead of updating the error syndrome, a known data sequence corresponding to the known data segment in the embedded field is remodulated into corresponding estimated sample values and subtracted from the read signal samples to form the sequence of sample errors representing the noise in the read signal which effectively cancels that part of the error event extending into the embedded field. This embodiment is understood with reference to FIG. 9.

Figure 9:
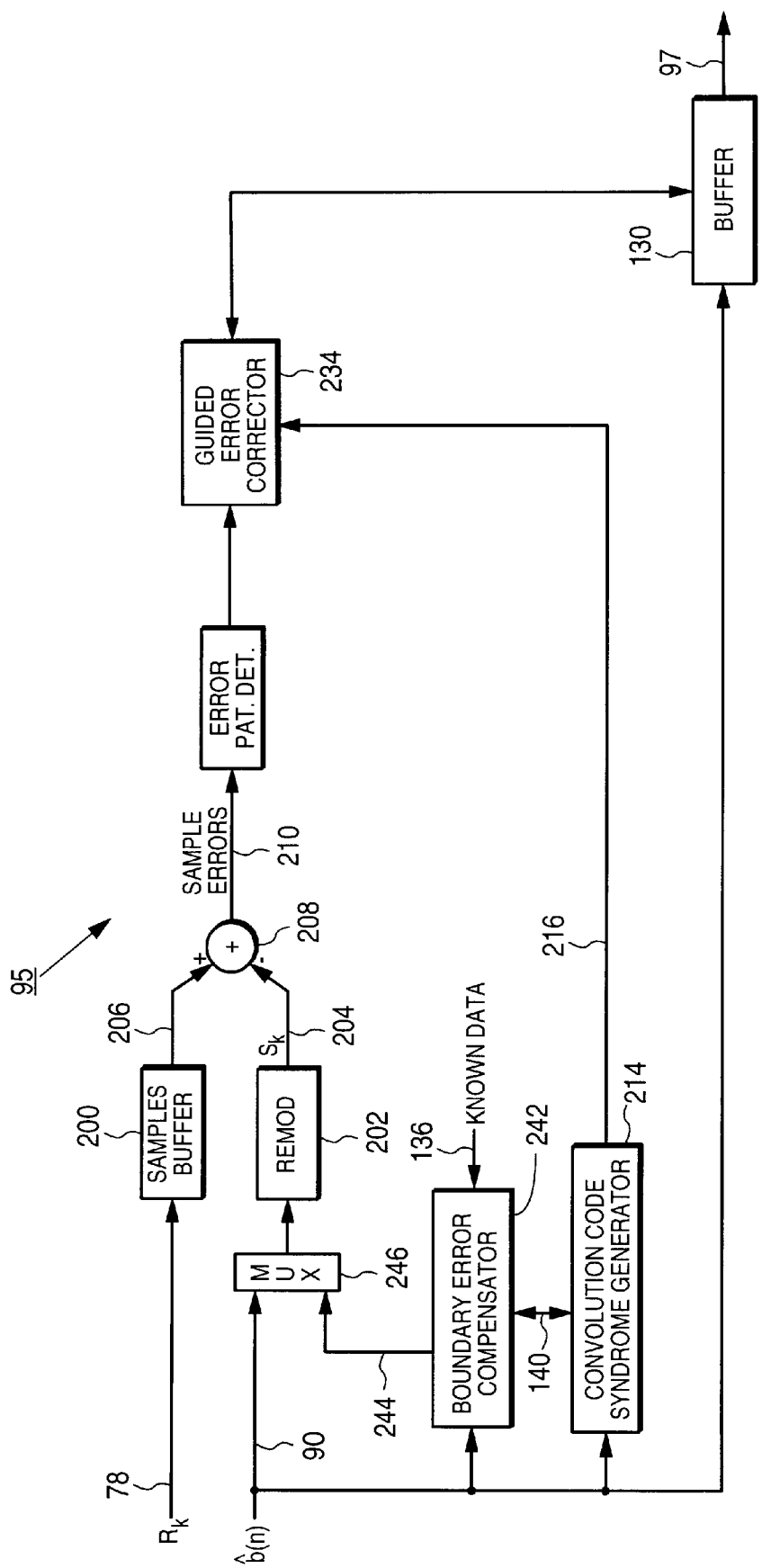
FIG. 9 shows a post processor according to an alternative embodiment of the present invention wherein a known data sequence corresponding to the known data segment of an embedded field is remodulated into an estimated sample sequence and subtracted from the read signal samples to form a sequence of sample errors which effectively cancels the part of an error event extending into an embedded field.

The post processor 95 shown in FIG. 9 operates similar to that of FIG. 8 except that the boundary error compensator 242 does not update the error syndrome 216 to reflect the contribution of a boundary error event extending into an embedded field. Instead, the boundary error compensator 242 generates a known sequence 244 corresponding to a known data segment in an embedded field. When the known data segment is being processed, the known sequence 244 is multiplexed 246 into the remodulator 202 instead of the preliminary sequence 90 output by the trellis sequence detector 88. This effectively cancels the part of a boundary error event extending into the embedded field. The residual part of the error event remaining in the user data field (if any) is still detectable by the EDC error syndrome generated over the user data field. In addition, the last NRZ bit of the first user data segment 106 can be corrected since the first NRZI bit of the embedded field is known. For example, if the first written NRZI bit of the embedded field 112 is a "1" bit then it means that the first NRZ bit of the embedded field 112 is always the opposite of the last NRZ bit of the user data segment 106. Once the first NRZ bit of the embedded field 112 has been determined, if the last NRZ bit of the user data segment 106 is the same, then the last bit of the user data segment 106 preceding the embedded field 112 is toggled and the EDC syndrome is updated with the corrected data. Alternatively, the EDC syndrome could be generated using the corrected data sequence rather than updated.

Consider, for example, the (+−+) error event shown in FIG. 6A. Multiplexing 246 the known preamble sequence (110011001100 . . . ) into the remodulator 202 effectively cancels the (+) extending into the secondary preamble field 112. The (−) error corrupting the last bit of first user data segment 106 can be corrected (toggled) and the EDC error syndrome updated since the first NRZI bit of the preamble 112 is known. This leaves only the (+) error in the first user data segment 106 which is still an error event detectable using the convolutional code EDC. Further, because the first user data segment 106 ends on a codeword boundary of the convolutional code, the (+−+) error event is converted from a codeword boundary error event into a codeword non-boundary error event. Thus, when correcting the end of the first user data segment 106, the codeword boundary error events are disabled by the guided error corrector 234 since a codeword boundary error event cannot occur.

In an alternative embodiment, the boundary error event is corrected by the unguided error corrector 230 after multiplexing 246 the known data sequence 244 into the remodulator 202. The error pattern detector 228 generates correlation values for error events occurring in the user data segment preceding or following the known segment. An error event is deemed to have spanned the boundary between the user data segment and the known data segment if a correlation value is negative (i.e., if correcting the error event will minimize the Euclidean distance after remodulating the known data sequence). The unguided error corrector 230 corrects the error event that generates the most negative correlation value (and updates the EDC error syndrome). During the guided mode, the guided error corrector 234 disables the codeword boundary error events at the end of the first user data segment 106 since any codeword boundary error will have been corrected by the unguided error corrector 230.

In yet another alternative embodiment, a special postamble sequence is employed which prevents the dominant error events associated with the trellis sequence detector 88 from extending past the end of the user data field. In the aforementioned patent entitled "AN ERROR DETECTION CONVOLUTION CODE AND POST PROCESSOR FOR CORRECTING DOMINANT ERROR EVENTS OF A TRELLIS SEQUENCE DETECTOR IN A SAMPLED AMPLITUDE READ CHANNEL FOR DISK STORAGE SYSTEMS," the dominant error events detected and corrected by the post processor 95 are listed in Table 2.

TABLE 2

| En | $E_{kFLUX}$ | $E_{kSNRZI}$ | $E_{kPR4}$ | $S_{kFLUX}$ |
|---|---|---|---|---|
| 0 | + | 1, −1 | 1, 0, −1 | 0 |
| 1 | +− | 1, −2, 1 | 1, −1, −1, 1 | 01 |
| 2 | +−+ | 1, −2, 2, −1 | 1, −1, 0, 1, −1 | 010 |
| 3 | +−+− | 1, −2, 2, −2, 1 | 1, −1, 0, 0, −1, 1 | 0101 |
| 4 | +−+−+ | 1, −2, 2, −2, 2, −1 | 1, −1, 0, 0, 0, 1, −1 | 01010 |
| 5 | +−+−+− | 1, −2, 2, −2, 2, −2, 1 | 1, −1, 0, 0, 0, 0, −1, 1 | 010101 |
| 6 | +−+−+−+ | 1, −2, 2, −2, 2, −2, 2, −1 | 1, −1, 0, 0, 0, 0, 0, 1, −1 | 0101010 |
| 7 | +0+ | 1, −1, 1, −1 | 1, 0, 0, 0, −1 | 0x0 |
| 8 | +00+ | 1, −1, 0, 1, −1 | 1, 0, −1, 1, 0, −1 | 0xx0 |
| 9 | +00+−+ | 1, −1, 0, 1, −2, 2, −1 | 1, 0, −1, 1, −1, 0, 1, −1 | 0xx010 |
| 10 | +−+00+ | 1, −2, 2, −1, 0, 1, −1 | 1, −1, 0, 1, −1, 1, 0, −1 | 010xx0 |
| 11 | +−+00+−+ | 1, −2, 2, −1, 0, 1, −2, 2, −1 | 1, −1, 0, 1, −1, 1, −1, 0, 1, −1 | 010xx010 |

Table 2 shows the error number En, and the error event $E_k$ in the flux domain ($E_{kFLUX}$), in the signed NRZI domain ($E_{kSNRZI}$) and in the PR4 domain ($E_{kPR4}$). Table 2 also shows the preliminary sequence 90 in the flux domain ($S_{kFLUX}$) that must be detected in order for the corresponding error event $E_k$ to be valid. The negative of all signed values shown in Table 2 are also valid error events (i.e., the same error events having opposite polarity) which are detected and corrected by the post processor 95 and validated by the complement of the preliminary sequence $S_{kFLUX}$ shown in Table 2.

For the error events listed in Table 2, a postamble of 010101 in NRZI will prevent the error events 1–6, 9 and 11 from occurring in the trellis sequence detector 88. This can be verified by examining the $S_{kFLUX}$ column in Table 2 with respect to the NRZI postamble sequence 010101. Assuming the last data flux bit is zero, then the written boundary flux is 0|0110011 where the left-most bit is the last data bit. The error event 0 can still occur, and the error events 7, 8 and 10 can cross over into a NRZI postamble sequence 010101, but these error events can be detected and corrected by evaluating the check bit (the last bit of the user data field) and the second and third bits of the postamble. The following table illustrates the possible sequences that could be detected, and the corresponding corrected output sequence, where C denotes the last bit of the user data field and PPPx denotes the first four bits of the postamble:

TABLE 3

| CPPPx | OUTPUT |
|---|---|
| 0x00x | 11001 |
| 0xx1x | 00110 |
| 0x1xx | 00110 |
| 1xx0x | 11001 |
| 1x0xx | 11001 |
| 1x11x | 00110 |

Notice that because the postamble is a known NRZI sequence, the last bit of the user data field C can also be corrected. The corrected sequence (output of Table 3) is used to generate or update the EDC error syndrome, and it is also multiplexed 246 into the remodulator 202. The boundary error events are disabled so that only error events occurring within the user data field are detected. This effectively cancels the contribution of an error event extending into the postamble leaving the contribution in the user data field which will likely be detected and corrected by the post processor 95 because that part of the error event is covered by the EDC error syndrome.

The objects of the invention have been fully realized through the embodiments disclosed herein. Those skilled in the art will appreciate that the various aspects of the invention can be achieved through different embodiments without departing from the essential function. For example, the boundary error compensator may be used to update any well known EDC; the present invention is not limited to parity or convolution codes. Further, any known data sequence can be used to detect the boundary error events; the preamble, postamble, and sync marks disclosed above are only examples of known data sequences which may be included in a data sector. The disclosed embodiments are thus illustrative and not intended to limit the scope of the present invention as appropriately construed from the following claims.

We claim:

1. A sampled amplitude read channel for reading a data sector recorded on a disk storage medium by detecting an estimated data sequence from a sequence of read signal sample values generated by sampling an analog read signal emanating from a read head positioned over the disk storage medium, the data sector comprising a user data segment and a known data segment, the sampled amplitude read channel comprising:

(a) a sampling device for sampling the analog read signal to generate the read signal sample values;

(b) a trellis sequence detector for detecting a preliminary sequence from the read signal sample values; and (c) a post processor for detecting and correcting errors in the preliminary sequence comprising:

(i) a syndrome generator, responsive to the preliminary sequence representing the user data segment, for generating an error syndrome according to a predetermined error detection code;

(ii) a boundary error compensator, responsive to the preliminary sequence, for compensating for a boundary error event spanning the user data segment and the known data segment; and (iii) a guided error corrector, responsive to the error syndrome, for correcting errors detected in the preliminary sequence.

2. The sampled amplitude read channel as recited in claim 1, wherein the boundary error compensator updates the error syndrome to compensate for the boundary error event.

3. The sampled amplitude read channel as recited in claim 1, wherein the known data segment comprises preamble data.

4. The sampled amplitude read channel as recited in claim 1, wherein the known data segment comprises sync mark data.

5. The sampled amplitude read channel as recited in claim 1, wherein the known data segment comprises postamble data for preventing a plurality of dominant error events associated with the trellis sequence detector from extending past the end of the user data segment.

6. The sampled amplitude read channel as recited in claim 1, wherein the post processor further comprises:
   (a) a remodulator for remodulating the preliminary sequence into a sequence of estimated sample values;
   (b) a sample error generator, responsive to the read signal sample values and the estimated sample values, for generating a sequence of sample errors; and
   (c) an error pattern detector, responsive to the sample errors, for detecting errors in the preliminary sequence.

7. The sampled amplitude read channel as recited in claim 6, wherein the remodulator further remodulates a known data sequence corresponding to the known data segment into corresponding estimated sample values to compensate for the boundary error event.

8. The sampled amplitude read channel as recited in claim 1, wherein the error syndrome is generated according to a convolution code.

9. The sampled amplitude read channel as recited in claim 1, wherein the user data segment comprises a split-field user data segment and the known data segment comprises an embedded field which separates first and second portions of the split-field user data segment.

10. The sampled amplitude read channel as recited in claim 9, wherein the boundary error compensator comprises means for comparing the preliminary sequence with an expected sequence for the known data segment.

11. The sampled amplitude read channel as recited in claim 10, wherein the boundary error compensator further comprises means for updating the error syndrome and means for transmitting the updated error syndrome to the syndrome generator.

12. A method of reading a data sector recorded on a disk storage medium by detecting an estimated data sequence from a sequence of read signal sample values generated by sampling an analog read signal emanating from a read head positioned over the disk storage medium, the data sector comprising a user data segment and a known data segment, the method comprising the steps of:
   (a) sampling the analog read signal to generate the read signal sample values;
   (b) detecting a preliminary sequence from the read signal sample values; and
   (c) generating an error syndrome according to a predetermined error detection code in response to the preliminary sequence representing the user data segment;
   (d) compensating for a boundary error event spanning the user data segment and the known data segment; and
   (e) in response to the error syndrome, correcting errors detected in the preliminary sequence.

13. The method of reading a data sector as recited in claim 12, wherein the error syndrome is updated to compensate for the boundary error event.

14. The method of reading a data sector as recited in claim 12, wherein the known data segment comprises preamble data.

15. The method of reading a data sector as recited in claim 12, wherein the known data segment comprises sync mark data.

16. The method of reading a data sector as recited in claim 12, wherein the known data segment comprises postamble data for preventing a plurality of dominant error events associated with the trellis sequence detector from extending past the end of the user data segment.

17. The method of reading a data sector as recited in claim 12, further comprising the steps of:
   (a) remodulating the preliminary sequence into a sequence of estimated sample values;
   (b) generating a sequence of sample errors in response to the read signal sample values and the estimated sample values; and
   (c) detecting errors in the preliminary sequence in response to the sample errors.

18. The method of reading a data sector as recited in claim 17, further comprising the step of remodulating a known data sequence corresponding to the known data segment into corresponding estimated sample values to compensate for the boundary error event.

19. The method of reading a data sector as recited in claim 12, wherein the error syndrome is generated according to a convolution code.

20. A sampled amplitude read channel for reading a data sector recorded on a disk storage medium by detecting an estimated data sequence from a sequence of read signal sample values generated by sampling an analog read signal emanating from a read head positioned over the disk storage medium, the data sector comprising a split-field user data segment and an embedded field having a known data sequence, the user data segment being split by the embedded field into first and second user data segment portions, the sampled amplitude read channel comprising:
   (a) a sampling device for sampling the analog read signal to generate the read signal sample values;
   (b) a trellis sequence detector for detecting a preliminary sequence from the read signal sample values; and
   (c) a post processor for detecting and correcting errors in the preliminary sequence comprising:
      (i) a syndrome generator, responsive to the preliminary sequence representing the one of the user data segment portions, for generating an error syndrome according to a predetermined error detection code;
      (ii) a boundary error compensator, responsive to the preliminary sequence, for compensating for a boundary error event spanning the one user data segment portion and the embedded field; and
      (iii) a guided error corrector, responsive to the error syndrome, for correcting errors detected in the preliminary sequence.

21. The sampled amplitude read channel as recited in claim 20, wherein the post processor further comprises:
   (iv) a remodulator for remodulating the preliminary sequence into a sequence of estimated sample values;
   (v) a sample error generator, responsive to the read signal sample values and the estimated sample values, for generating a sequence of sample errors; and
   (vi) an error pattern detector, responsive to the sample errors, for detecting errors in the preliminary sequence.

22. The sampled amplitude read channel as recited in claim 21, wherein the remodulator further remodulates the known data sequence into corresponding estimated sample values to compensate for the boundary error event.

* * * * *